(12) United States Patent
Filer et al.

(10) Patent No.: US 10,729,973 B2
(45) Date of Patent: Aug. 4, 2020

(54) DYNAMIC SELECTION OF SENSOR SENSITIVITY IN A GAME INPUT SYSTEM

(75) Inventors: Eric P. Filer, Renton, WA (US); Loren Douglas Reas, Kent, WA (US); Vasco Rubio, Edmonds, WA (US); Dennis W. Tom, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1981 days.

(21) Appl. No.: 12/165,481

(22) Filed: Jun. 30, 2008

(65) Prior Publication Data

US 2009/0325705 A1 Dec. 31, 2009

(51) Int. Cl.
| | | |
|---|---|---|
| *A63F 13/22* | (2014.01) | |
| *G06F 3/038* | (2013.01) | |
| *A63F 13/213* | (2014.01) | |
| *A63F 13/235* | (2014.01) | |
| *A63F 13/211* | (2014.01) | |
| *A63F 13/30* | (2014.01) | |
| *A63F 13/40* | (2014.01) | |
| *A63F 13/20* | (2014.01) | |

(52) U.S. Cl.
CPC .............. *A63F 13/22* (2014.09); *G06F 3/038* (2013.01); *A63F 13/211* (2014.09); *A63F 13/213* (2014.09); *A63F 13/235* (2014.09); *A63F 2300/105* (2013.01); *A63F 2300/1018* (2013.01); *A63F 2300/1031* (2013.01); *A63F 2300/407* (2013.01); *A63F 2300/535* (2013.01)

(58) Field of Classification Search
CPC ...... A63F 13/22; A63F 13/213; A63F 13/235; A63F 13/211; G06F 3/038

USPC .................................................. 463/39; 65/39
See application file for complete search history.

(56) References Cited

U.S. PATENT DOCUMENTS 5,553,859 A 9/1996 Kelly
6,473,085 B1 10/2002 Brock
(Continued)

FOREIGN PATENT DOCUMENTS

WO WO 2007030947 A1 3/2007
WO WO 2008025973 A2 3/2008

OTHER PUBLICATIONS

"Motion Sensor Controls coming to Xbox 360 with Tiltboard", http://www. worthplaying.com, Downloaded from Internet May 1, 2008, 4 pages.
(Continued)

*Primary Examiner* — Kang Hu
*Assistant Examiner* — Thomas H Henry
(74) *Attorney, Agent, or Firm* — Alleman Hall Creasman & Tuttle LLP

(57) ABSTRACT

Sensor parameters in a remote game peripheral are dynamically. The remote game peripheral may contain one or more sensors that measure the motion of the remote game peripheral via at least one sensor. This information is communicated to a game server. The game server then determines if the sensor sensitivity setting is appropriate for the expected motion of the remote game peripheral at that point in the game. The game server may, at any time during game play, transmit a sensor sensitivity adjustment to adjust the sensor sensitivity level setting to one that is likely to capture the motion of the game peripheral with minimal loss of data. The dynamic adjustment of the sensitivity level may also be used to provide corrective feedback to a game player.

17 Claims, 5 Drawing Sheets

FINE GESTURE

(56) References Cited

U.S. PATENT DOCUMENTS

| | | | |
|---|---|---|---|
| 6,861,946 B2 | 3/2005 | Verplaetse | |
| 7,292,223 B2 | 11/2007 | Suprun | |
| 7,301,526 B2 * | 11/2007 | Marvit et al. | 345/156 |
| 2002/0173940 A1 * | 11/2002 | Thacker et al. | 703/5 |
| 2006/0177103 A1 | 8/2006 | Hildreth | |
| 2008/0009332 A1 | 1/2008 | Kake | |
| 2008/0096657 A1 | 4/2008 | Benoist | |
| 2009/0062005 A1 * | 3/2009 | Lu et al. | 463/37 |
| 2009/0291759 A1 * | 11/2009 | Cox et al. | 463/37 |

OTHER PUBLICATIONS

NASCR—National Association of Specialist Computer Retailers, Razer Diamondback Precision Gaming Mouse, http://www.nascr.org, Downloaded from Internet May 2, 2008, 11 pages.

Review: Talismoon Tiltboard Controller Mod, http://reviews.dcemu.co.uk, Downloaded from Internet May 2, 2008, 8 pages.

* cited by examiner

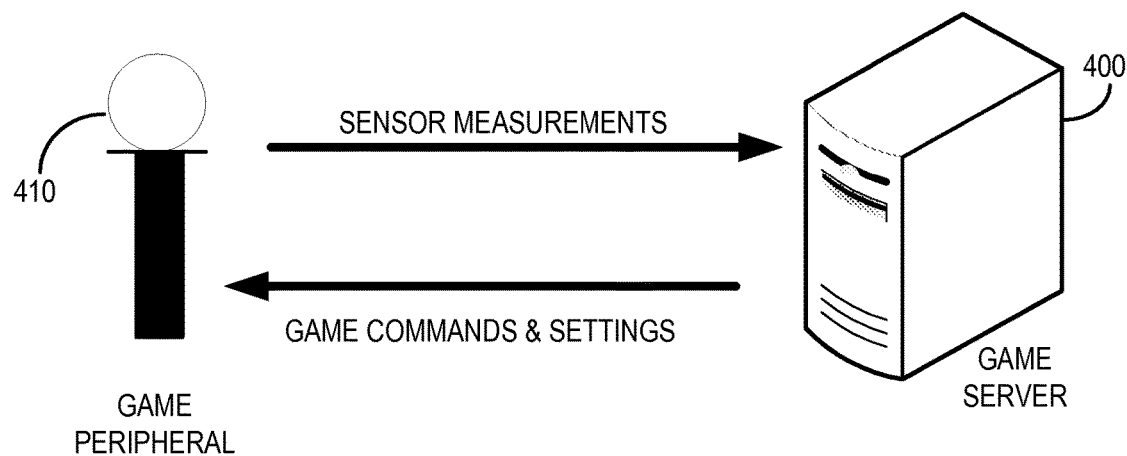
*FIG. 4*
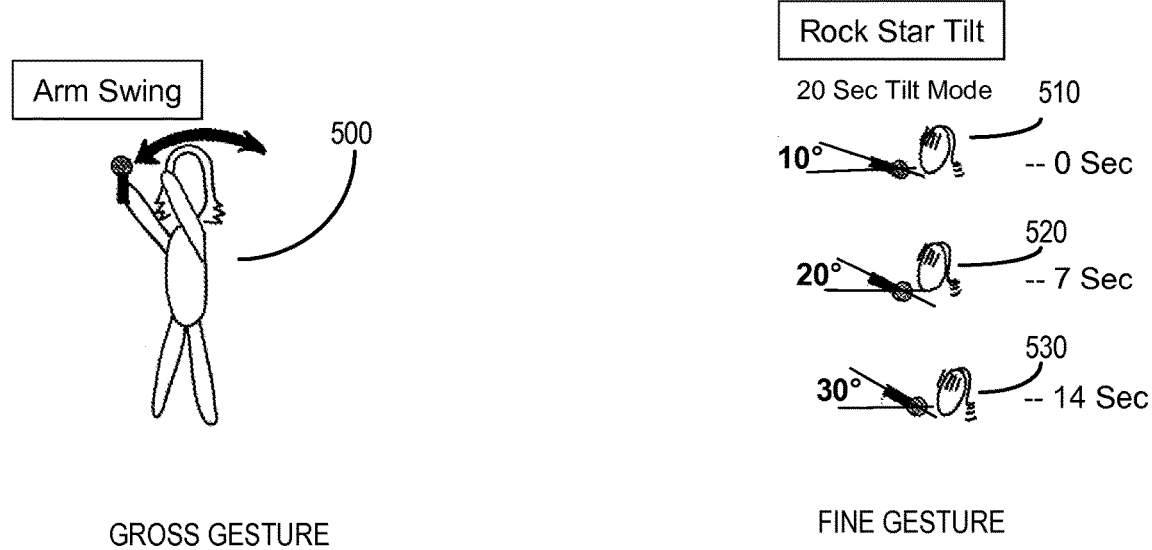
*FIG. 5A*  *FIG. 5B*

DYNAMIC SELECTION OF SENSOR SENSITIVITY IN A GAME INPUT SYSTEM

TECHNICAL FIELD

The technical field generally relates to game systems with remote controller units, and more specifically to the communication of commands and data between a game server and a game controller unit.

BACKGROUND

Game systems commonly comprise a game server and remote controller units located remotely from the game server that serve to provide input from the user of the game to the game server. The game server sends commands to the remote controller in turn to advance the action of the game with which a user is interacting. Current game systems involve the user more actively by establishing a wireless communication pathway for instructions and data transfer between the remote controller and the game system, in some instances providing the capability for a user to move the remote controller and have this relative motion captured and tracked by the game server.

SUMMARY

This Summary is provided to introduce a selection of concepts in a simplified form that are further described below in the Detailed Description of the Illustrative Embodiments. This Summary is not intended to identify key features or essential features of the claimed subject matter, nor is it intended to be used to limit the scope of the claimed subject matter.

In a gaming system that utilizes motion detection by a sensor, such as a gyroscope, magnetometer, accelerometer, or optical sensor, within a game remote controller the palette of supported gestures is limited by the pre-set sensor sensitivity of the device. To achieve the fullest range of a particular gesture input the sensor sensitivity must be set to a range that may capture the full range of a user motion without losing portions of either gross or fine gestures. In the instant system, the game server reassigns the sensor sensitivity in the game controller to set the resolution dynamically such that small gestures that require finer movements, as well as large gestures that require a broader range of movements, can have the maximum effect within the game. By having the game server software assign the sensitivity range resolution dynamically, and the input device performing the adjustment and communicating the user movements back to the game server, fine gestures as well as broader, larger gestures can be discerned with better accuracy and precision. This dynamic sensitivity adjustment is used by the game server to better inform the game user as to the optimal course of the game so as to enhance the user game experience.

BRIEF DESCRIPTION OF THE DRAWINGS

The foregoing summary, as well as the following detailed description, is better understood when read in conjunction with the appended drawings. For the purpose of illustrating dynamic sensitivity adjustment for sensors within a remote game peripheral, there is shown in the drawings exemplary constructions thereof, however dynamic sensitivity adjustment for sensors within a remote game peripheral is not limited to the specific methods and instrumentalities disclosed.

FIG. 4 is a block diagram of command and control messages between a game server and remote game peripheral containing a sensor in which dynamic sensitivity adjustment may be implemented.

FIG. 5A is a depiction of a gross gesture for which dynamic sensitivity adjustment can be scaled to accommodate.

FIG. 5B is a depiction of fine gesture tilt angle measurement for which dynamic sensitivity adjustment can be scaled to accommodate.

DETAILED DESCRIPTION OF ILLUSTRATIVE EMBODIMENTS

Figure 1:
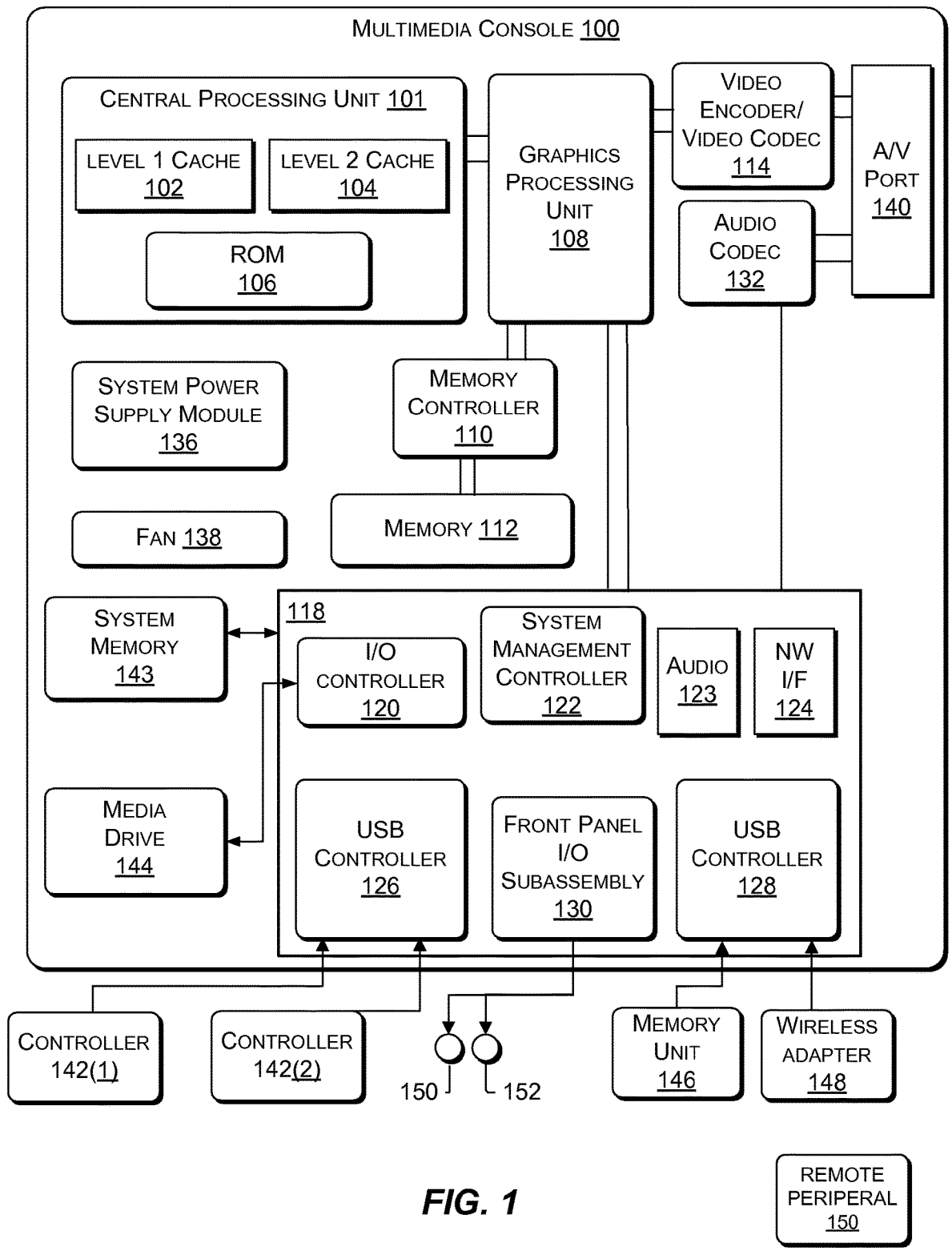
FIG. 1 is a block diagram of an example game console and remote game peripheral via which dynamic sensitivity adjustment for a sensor can be implemented.

In an exemplary embodiment, the processor comprises a game console, such as an XBOX® game console for example. FIG. 1 is a block diagram of an example game console 100 via which dynamic sensitivity adjustment for a sensor can be implemented. The game console 100 along with other devices described herein, such as a display device, are capable of performing the functions needed to accomplish dynamic sensitivity adjustment for a sensor, as described herein. A typical game console comprises hardware and software that are specifically designed to support a core set of usage scenarios.

Game console 100 has a central processing unit (CPU) 101 having a level 1 (L1) cache 102, a level 2 (L2) cache 104, and a flash ROM (Read-only Memory) 106. The level 1 cache 102 and level 2 cache 104 temporarily store data and hence reduce the number of memory access cycles, thereby improving processing speed and throughput. The flash ROM 106 can store executable code that is loaded during an initial phase of a boot process when the game console 100 is initially powered. Alternatively, the executable code that is loaded during the initial boot phase can be stored in a FLASH memory device (not shown). Further, ROM 106 can be located separate from CPU 101. Game console 100 can, optionally, be a multi-processor system; for example game console 100 can have three processors 101, 103, and 105, where processors 103 and 105 have similar or identical components to processor 101.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display device. A memory controller 110 is connected to the GPU 108 and CPU 101 to facilitate processor access to various types of memory 112, such as, but not limited to, a RAM (Random Access Memory).

Game console 100 includes an I/O controller 120, a system management controller 122, an audio processing unit 123, a network interface controller 124, a first USB host controller 126, a second USB controller 128 and a front panel I/O subassembly 130 that may be implemented on a module 118. The USB controllers 126 and 128 serve as hosts for peripheral controllers 142(1)-142(2), a wireless adapter 148, a wireless remote peripheral 150, and an external memory unit 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like. The wireless remote game peripheral 150 may connect to the game console through the wireless adaptor 148 as well.

System memory 143 is provided to store application data that is loaded during the boot process. A media drive 144 is provided and may comprise a DVD/CD drive, hard drive, or other removable media drive, etc. The media drive 144 may be internal or external to the game console 100. When media drive 144 is a drive or reader for removable media (such as removable optical disks, or flash cartridges), then media drive 144 is an example of an interface onto which (or into which) media are mountable for reading. Application data may be accessed via the media drive 144 for execution, playback, etc. by game console 100. Media drive 144 is connected to the I/O controller 120 via a bus, such as a Serial ATA bus or other high speed connection (e.g., IEEE 5394). While media drive 144 may generally refer to various storage embodiments (e.g., hard disk, removable optical disk drive, etc.), game console 100 may specifically include a hard disk 152, which can be used to store game data, application data, or other types of data, and on which file system components may be implemented.

The system management controller 122 provides a variety of service functions related to assuring availability of the game console 100. The audio processing unit 123 and an audio codec 132 form a corresponding audio processing pipeline with high fidelity, 5D, surround, and stereo audio processing according to aspects of the present subject matter described herein. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button and any LEDs (light emitting diodes) or other indicators exposed on the outer surface of the game console 100. A system power supply module 136 provides power to the components of the game console 100. A fan 138 cools the circuitry within the game console 100.

The CPU 101, GPU 108, memory controller 110, and various other components within the game console 100 are interconnected via one or more buses, including serial and parallel buses, a memory bus, a peripheral bus, and a processor or local bus using any of a variety of bus architectures.

When the game console 100 is powered on or rebooted, application data can be loaded from the system memory 143 into memory 112 and/or caches 102, 104 and executed on the CPU 101. The application can present a graphical user interface that provides a consistent user experience when navigating to different media types available on the game console 100. In operation, applications and/or other media contained within the media drive 144 may be launched or played from the media drive 144 to provide additional functionalities to the game console 100.

The game console 100 may be operated as a standalone system by simply connecting the system to a television or other display. In this standalone mode, the game console 100 may allow one or more users to interact with the system, watch movies, listen to music, and the like. However, with the integration of broadband connectivity made available through the network interface 124 or the wireless adapter 148, the game console 100 may further be operated as a participant in a larger network community.

Figure 2:
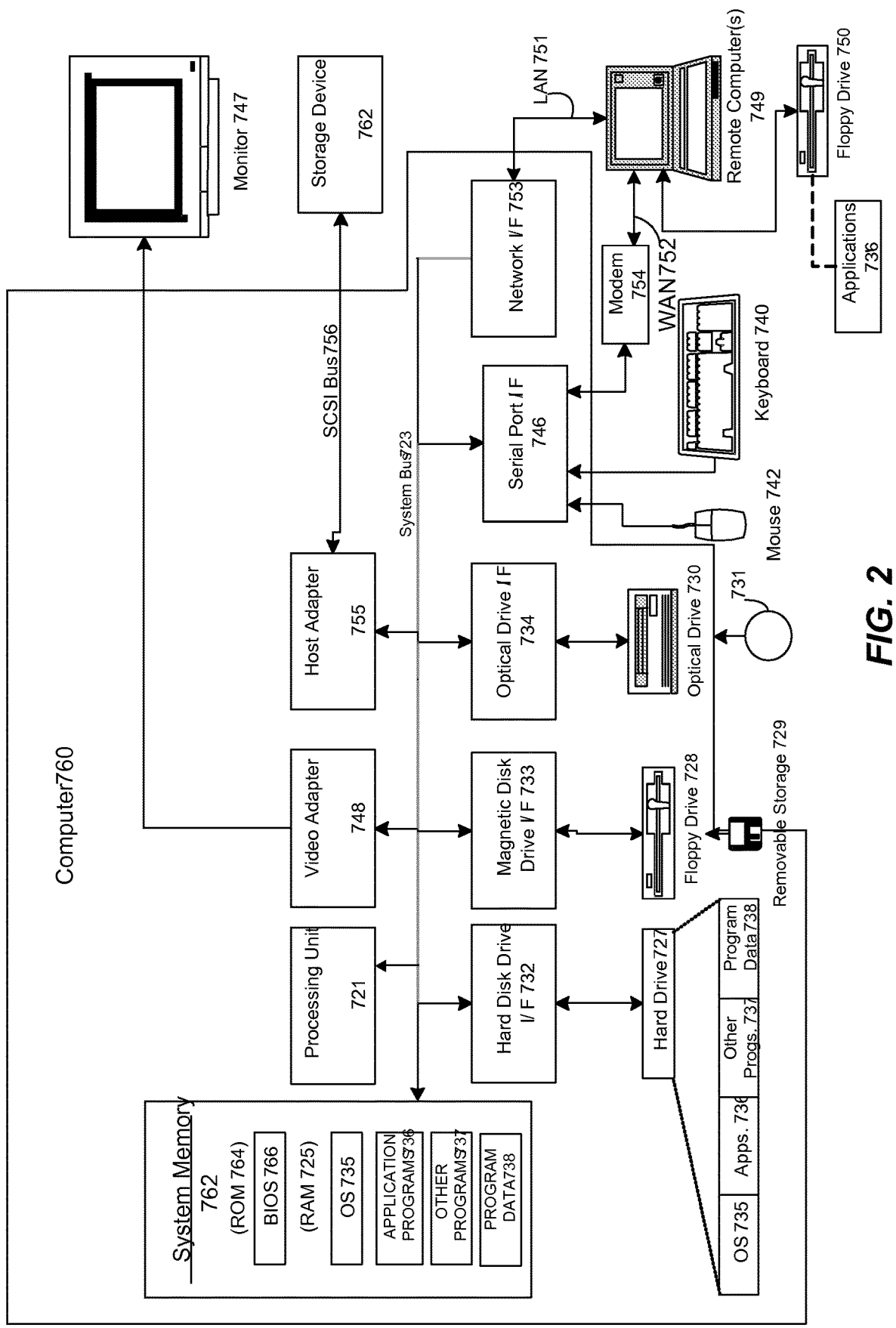
FIG. 2 is a depiction of a suitable computing environment in which dynamic sensitivity adjustment for a sensor can be implemented.

FIG. 2 and the following discussion provide a brief general description of a suitable computing environment in which dynamic sensitivity adjustment for sensors within a remote game peripheral can be implemented. Although not required, various aspects of dynamic sensitivity adjustment for sensors within a remote game peripheral can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of a wireless protocol for voice-only devices in a gaming console can be practiced with other computer system configurations, including hand held devices, multi processor systems, microprocessor based or programmable consumer electronics, network PCs, minicomputers, mainframe computers, and the like. Further, dynamic sensitivity adjustment for sensors within a remote game peripheral also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 721, the memory (both ROM 764 and RAM 725), the basic input/output system (BIOS) 766, and various input/output (I/O) devices such as a keyboard 740, a mouse 762, a monitor 747, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with dynamic sensitivity adjustment for sensors within a remote game peripheral as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain cases, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 2, an exemplary general purpose computing system includes a conventional computing device 760 or the like, including a processing unit 721, a system memory 762, and a system bus 723 that couples various system components including the system memory to the processing unit 721. The system bus 723 may be any of several types of bus structures including a memory bus or memory controller, a peripheral bus, and a local bus using any of a variety of bus architectures. The system memory includes read only memory (ROM) 764 and random access memory (RAM) 725. A basic input/output system 766 (BIOS), containing basic routines that help to transfer information between elements within the computing device 760, such as during start up, is stored in ROM 764. The computing device 760 may further include a hard disk drive 727 for reading from and writing to a hard disk (hard disk not shown), a magnetic disk drive 728 (e.g., floppy drive) for reading from or writing to a removable magnetic disk 729 (e.g., floppy disk, removal storage), and an optical disk drive 730 for reading from or writing to a removable optical disk 731 such as a CD ROM or other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer readable media provide non volatile storage of computer readable instructions, data structures, program modules and other data for the computing device 760. Although the exemplary environment described herein employs a hard disk, a removable magnetic disk 729, and a removable optical disk 731, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 729, optical disk 731, ROM 764, or RAM 725, including an operating system 735, one or more application programs 736, other program modules 737, and program data 738. A user may enter commands and information into the computing device 760 through input devices such as a keyboard 740 and pointing device 762 (e.g., mouse). Other input devices (not shown) may include a microphone, joystick, game pad, satellite disk, scanner, or the like. These and other input devices are often connected to the processing unit 721 through a serial port interface 746 that is coupled to the system bus, but may be connected by other interfaces, such as a parallel port, game port, or universal serial bus (USB). A monitor 747 or other type of display device is also connected to the system bus 723 via an interface, such as a video adapter 748. In addition to the monitor 747, computing devices typically include other peripheral output devices (not shown), such as speakers and printers. The exemplary environment of FIG. 2 also includes a host adapter 755, Small Computer System Interface (SCSI) bus 756, and an external storage device 762 connected to the SCSI bus 756.

The computing device 760 may operate in a networked environment using logical connections to one or more remote computers, such as a remote computer 749. The remote computer 749 may be another computing device (e.g., personal computer), a server, a router, a network PC, a peer device, or other common network node, and typically includes many or all of the elements described above relative to the computing device 760, although only a memory storage device 750 (floppy drive) has been illustrated in FIG. 6. The logical connections depicted in FIG. 2 include a local area network (LAN) 751 and a wide area network (WAN) 752. Such networking environments are commonplace in offices, enterprise wide computer networks, intranets and the Internet.

When used in a LAN networking environment, the computing device 760 is connected to the LAN 751 through a network interface or adapter 753. When used in a WAN networking environment, the computing device 760 can include a modem 754 or other means for establishing communications over the wide area network 752, such as the Internet. The modem 754, which may be internal or external, is connected to the system bus 723 via the serial port interface 746. In a networked environment, program modules depicted relative to the computing device 760, or portions thereof, may be stored in the remote memory storage device. It will be appreciated that the network connections shown are exemplary and other means of establishing a communications link between the computers may be used.

While it is envisioned that numerous embodiments of dynamic sensitivity adjustment for sensors within a remote game peripheral are particularly well-suited for computerized systems, nothing in this document is intended to limit dynamic sensitivity adjustment for sensors to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for dynamic sensitivity adjustment for sensors within a remote game peripheral, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing dynamic sensitivity adjustment for sensors within a remote game peripheral.

The program(s) can be implemented in assembly or machine language, if desired. In any case, the language can be a compiled or interpreted language, and combined with hardware implementations. The methods and apparatuses for implementing dynamic sensitivity adjustment for sensors within a remote game peripheral also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of dynamic sensitivity adjustment for sensors within a remote game peripheral. Additionally, any storage techniques used in connection with dynamic sensitivity adjustment for sensors within a remote game peripheral can invariably be a combination of hardware and software.

Figure 3:
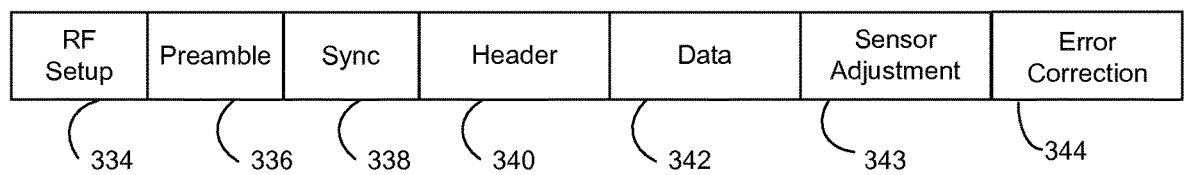
FIG. 3 is a depiction of a sensor adjustment location within a protocol message sent to a remote game peripheral by which dynamic sensitivity adjustment for a sensor can be implemented.

In an exemplary embodiment shown in FIG. 3, a remote game peripheral 410 is connected to a game server 400 using a wireless or wired connection that is operative to transmit message between the game server 400 and the remote game peripheral 410. If the connection is through a wireless adapter, the game sensitivity adjustment is transmitted as a standard part of the message protocol. In the exemplary embodiment, the message is composed for wireless transmission by first appending RF Setup 334 information that provides the hardware setup information for receipt of the message. The message Preamble 336 and Sync 338 fields are transmitted to achieve software preparation and synchronization to allow the incoming message to be properly decoded and saved in an incoming message input buffer. The message Header 340 provides identification information for the data 342 following such that the message information may be used for its intended purpose. In this exemplary embodiment, the Sensor Adjustment 343 command data is received as a portion of the message data 342 sent to the remote game peripheral. The Error Correction 344 field at the end of the message provides data security against mis-transmitted or garbled messages.

As shown in FIG. 4, a game peripheral 410 is located remotely from a game server 400 and connected to the game server 400 through a bidirectional communication channel. This bi-directional communication channel is used to transmit sensor measurements recorded by the game peripheral 410 to the game server 400 and to transmit game commands and settings from the game server 400 to the game peripheral 410. In an exemplary embodiment, the game commands and settings may include a command to adjust a sensor sensitivity setting and the updated sensor setting that may be used to perform the adjustment. The adjustment to the sensor setting within the game peripheral 410 may be used to specify a new sensor sensitivity range for any one of the sensors within the remote game peripheral at any point during the playing of a game. Thus, if game play by a user requires an action, movement, or input that may only be captured if the resolution of the sensor sensitivity measurement within the sensor is set to the largest measurement range, the game server transmits a command dynamically when necessary to adjust the sensitivity range of the sensor to its largest measurement range. Alternatively, if game play by a user requires an action, movement, or input that may only be captured if the resolution of the sensor sensitivity measurement within the sensor is set to a smaller measurement range, the game server transmits a command to dynamically adjust the sensitivity range of the sensor to a smaller measurement range. Measurement ranges for the sensitivity settings differ with each type of sensor that may be used within the remote game peripheral 410. However, each measurement range for a particular sensor is assigned an identifying value that is communicated from the game server 400 to the game peripheral 410. The remote game peripheral utilizes the identifying value as a selection index for the sensitivity range table. The game peripheral 410 retrieves the measurement range setting from the sensitivity range table and adjusts the measurement range for the game peripheral dynamically.

In a non-limiting embodiment, an example of the functionality described above is represented in FIGS. 5A and 5B. In this non-limiting embodiment, the remote game peripheral 410 is represented by a hand-held device in which the sensor may be an accelerometer. The accelerometer may be used to measure hand-held device motion start and stop times, tilt of the hand-held device with respect to an initial frame of reference in x, y, z coordinate space, velocity and instant acceleration of the hand-held device. In this non-limiting embodiment gestures by the game player are captured as movement parameters by the sensor, an accelerometer in this example, and communicated to the game server. In FIG. 5A without setting the proper sensitivity range a gross gesture 500 by a game player such as swinging the hand-held remote game peripheral through a broad arc from one side of the body to the other may be clipped in this example the upper range of motion is not captured due to the sensitivity of the sensor being set to a range of measurement that is not broad enough to capture the entire arc of motion. To forestall clipping, and the associated loss of motion data, the game server 400 may send a command to the remote game peripheral to adjust the sensitivity of the sensor to a broader range when gross gestures are expected. The game server may know when gross or finer gestures are expected by following a game script. The game script, as prepared by the author of the game, may include sensor sensitivity settings that anticipate the type of gestures expected at any given point in the game. The game server is then able to dynamically prepare the remote game peripheral for the expected range of motion by transmitting a sensor sensitivity adjustment command and a new sensor sensitivity setting to the remote game peripheral as necessary.

In an exemplary embodiment, the game performs an initialization of the remote game peripheral when the game starts. An initial frame of reference is established in x, y, z axis coordinates for the position of the remote game peripheral. This initial position is set to x=0, y=0, and z=0. As represented in FIG. 5B, during a 20 second time window for measuring movement of the peripheral, the measurement of tilt angle for finer gestures may be represented by measurements of angular displacement along each of the x, y, and z axes. The expected gesture, according to the game script at this moment in the game, may be a finer gesture and the game server may send a sensor sensitivity adjustment to the game peripheral to adjust the measurement range to capture a small movement of the remote game peripheral. In this exemplary embodiment, a game player may be holding the remote game peripheral at an angle of 10 degrees in the z axis, with x and y axes at zero at an initial time=0 point 510, which is the start point of the measured time window. At time=7 seconds 520 the tilt angle in the z axis has increased to 20 degrees, and at time=14 seconds 530 the tilt angle in the z axis has increased to 30 degrees. At the close of the measurement window, the tilt angle and time values are transmitted to the game server. The game server may then calculate the total tilt and time values for the remote game peripheral and determine the total movement of the fine gesture made by the game player. This information for the game player currently using the remote game peripheral is stored in the game server.

In this exemplary embodiment, the accelerometer transmits the start time, stop time, velocity and instant acceleration measurements to the game server. The game server may then calculate the distance the remote game peripheral has moved by doubly integrating the instant acceleration value. The distance traveled and the position information in x, y, z axis coordinates may then be compared against a pre-stored library of game user movements. Depending upon the game script the comparison of the game player's movement may be used to provide feedback to the game player that will allow the game player to assess personal performance in the game at the time the feedback is provided.

Figure 6:
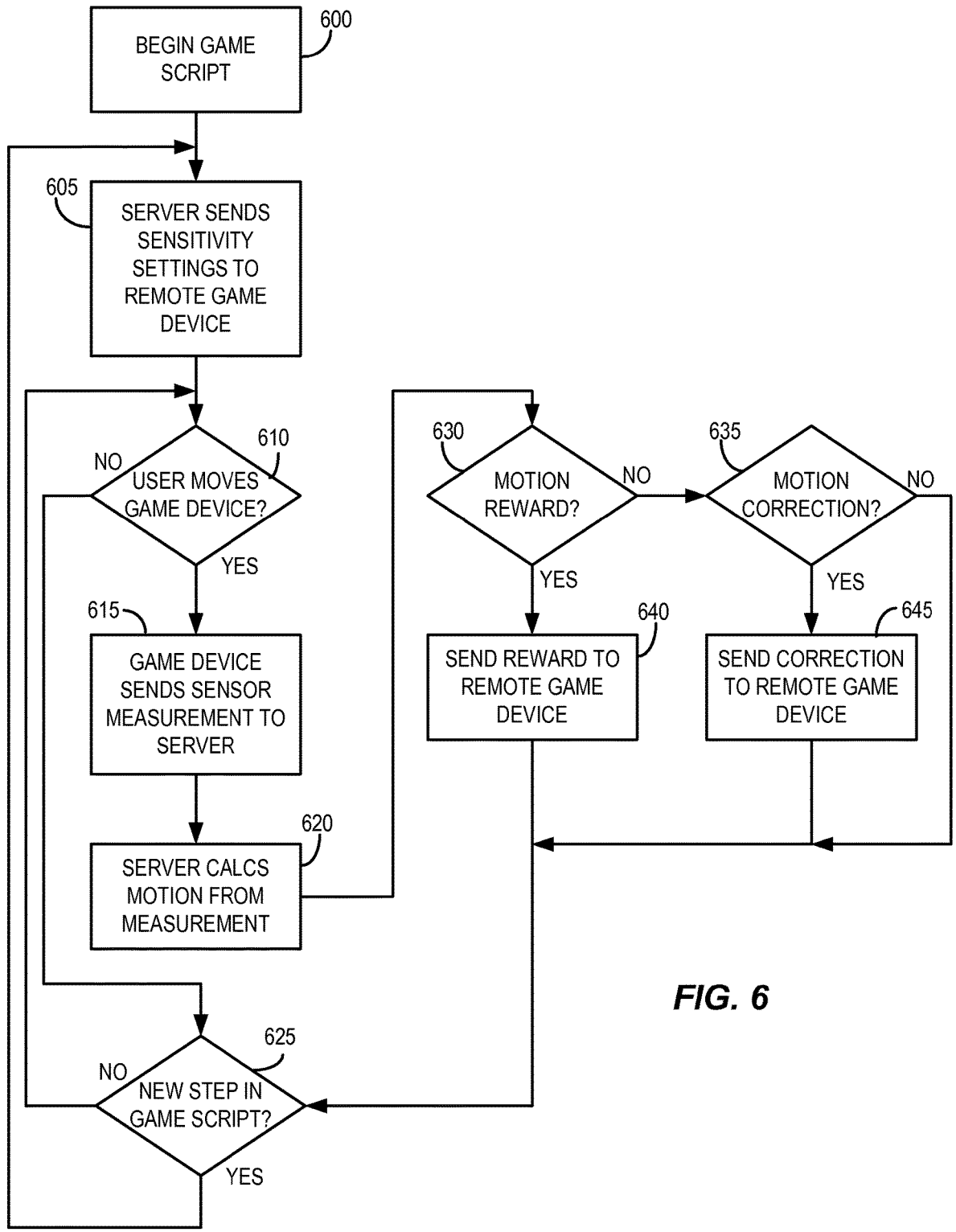
FIG. 6 is a flow diagram for an exemplary embodiment of dynamic sensitivity adjustment used in an active game script scenario.

Another exemplary embodiment is referenced in FIG. 6. A game author creates a game script that utilizes the capability for the dynamic adjustment of sensor sensitivity and embeds sensor sensitivity settings in the script. Once the game script is initiated 600, the initial sensor sensitivity setting is transmitted to the remote game peripheral. The setting value may be embedded within the command and setting message 605 as a pre-set number of bits as a dedicated sensitivity adjustment setting value. In this exemplary embodiment, the game server awaits messages from the remote game server indicating that the game player has moved the remote game server from the last recorded position 610. The remote game peripheral sends sensor movement information that may include positional information in x, y, z axis parameters, velocity, instant acceleration, and tilt angle information if the sensor within the remote game peripheral is an accelerometer 615. However, these sensor movement parameters should in no way be considered limiting as each sensor will have its own set of pre-defined measurements that are utilized to indicate repositioning or movement of the remote game peripheral. In the instant embodiment, by way of example, the game server may use the movement parameters received from the remote game server to calculate position, tilt, direction and other position related values from the sensor parameters received 620. The game server may then retrieve a gesture from a library of gestures stored within the game server and compare the movement parameters calculated against the pre-stored gesture parameters. The game software may then be operative to compare the gesture against the timing and/or step within the game script to determine if the game player has exceeded a pre-set threshold value that indicates that the game player has performed an action that is worthy of a reward 630 based upon the pre-set expectations for the game script. If the game player has exceeded the action reward value, the game server may send a command to the remote game peripheral to turn on reward lights, generate a noise, or provide bonus points, or activate any other reward system available within the game software 640. This reward feedback provides an indication to a game player that they are successfully mastering the scripted expectations of the game, thus enhancing the game player's enjoyment by providing indications of success in play.

Continuing in the exemplary embodiment, the comparison of the remote game peripherals motion against the retrieved library gesture may indicate that the game user has not performed an action that meets the minimum expected threshold value for a gesture at that moment in the game 635. The game server may then instead of sending a reward command, the game server may send a correction command to the remote game server 645. This command may light only a single light on the remote game serve, play a raucous noise, or provide another indication that the game player is not meeting the minimum expectations of the game. Once again, this correction feedback serves as a game enhancement by providing information to game user that they are not meeting the expectations of the game, and at what point they are not meeting the game expectations, such that correction is possible. This provides the game player with the knowledge of where expectations were not met such that they can improve their performance at those portions of the game such that they will improve over time. Once again, the remote game peripheral provides knowledge that will enhance the game player's experience in the game. The game script continues to advance 625 until the entire game script has been completed.

While dynamic sensitivity adjustment for sensors within a remote game peripheral has been described in connection with the example embodiments of the various figures, it is to be understood that other similar embodiments can be used or modifications and additions can be made to the described embodiments for performing the same functions of dynamic sensitivity adjustment for sensors within a remote game peripheral without deviating therefrom. Therefore, dynamic sensitivity adjustment for sensors within a remote game peripheral as described herein should not be limited to any single embodiment, but rather should be construed in breadth and scope in accordance with the appended claims.

What is claimed:

1. A system, comprising:
a processor; and
memory coupled to the processor, the memory comprising executable instructions that when executed by the processor cause the processor to effectuate operations comprising:

execute a game application, the game application configured to respond to gesture input detected based on one or more sensor measurements recorded by sensors of a remote game peripheral and received by a game server, where the game application supports at least a first set and a second set of gestures, the second set of gestures characterized by a greater range of motion than the first set, and where the game application includes a game script that defines an ordered sequence of steps corresponding to gestures expected by the game application during execution of the game application, the ordered sequence of steps specifying gestures from both the first set and the second set of gestures;

based on a first step in the ordered sequence of steps corresponding to a gesture of the first set of gestures, predict that a first upcoming gesture belongs to the first set of gestures;

send first sensitivity settings to the remote game peripheral to affect a sensitivity with which a first set of sensor measurements are recorded, the first set of sensor measurements corresponding to the first upcoming gesture;

after detecting the first upcoming gesture from the first set of sensor measurements received from the remote game peripheral, and based on a second step in the ordered sequence of steps corresponding to a gesture of the second set of gestures, predict that a second upcoming gesture belongs to the second set of gestures; and send second sensitivity settings to the remote game peripheral to affect a sensitivity with which a second set of sensor measurements are recorded, the second set of sensor measurements corresponding to the second upcoming gesture.

2. The system of claim 1, the remote game peripheral is communicatively coupled to the game server via a wireless communication channel.

3. The system of claim 1, the remote game peripheral is communicatively coupled to the game server via a wired communication channel.

4. The system of claim 1, the operations further comprising, based on the one or more sensor measurements recorded by the sensors of the remote game peripheral and received by the game server, calculating position, distance, and velocity information of the remote game peripheral by using a library of motion parameters stored in the game server.

5. The system of claim 4, the operations further comprising:
upon detecting a gesture based on the one or more sensor measurements, transmitting a reprimand upon determining that the detected gesture fails to meet a threshold gesture value.

6. The system of claim 1, wherein a sensitivity parameter of each of the sensors of the remote game peripheral is dynamically modifiable responsive to manipulation of the remote game peripheral.

7. The system of claim 1, the remote game peripheral further comprising a sensitivity range table utilizable to adjust a measurement range of the sensors of the remote game peripheral.

8. A method, comprising:
executing a game application on a game server, the game application configured to respond to gesture input detected based on one or more sensor measurements recorded by sensors of a remote game peripheral and received by the game server, where the game application supports at least a first set and a second set of gestures, the second set of gestures characterized by a greater range of motion than the first set, and where the game application includes a game script that defines an ordered sequence of steps corresponding to gestures expected by the game application during execution of the game application, the ordered sequence of steps specifying gestures from both the first set and the second set of gestures;

based on a first step in the ordered sequence of steps corresponding to a gesture of the first set of gestures, predicting that a first upcoming gesture belongs to the first set of gestures;

sending first sensitivity settings to the remote game peripheral to affect a sensitivity with which a first set of sensor measurements are recorded, the first set of sensor measurements corresponding to the first upcoming gesture;

after detecting the first upcoming gesture from the first set of sensor measurements received from the remote game peripheral, and based on a second step in the ordered sequence of steps corresponding to a gesture of the second set of gestures, predicting that a second upcoming gesture belongs to the second set of gestures; and sending second sensitivity settings to the remote game peripheral to affect a sensitivity with which a second set of sensor measurements are recorded, the second set of sensor measurements corresponding to the second upcoming gesture.

9. The method of claim 8, further comprising:
selecting the first and second upcoming gestures from a library of gestures.

10. The method of claim 8, further comprising:
calculating position, distance, and velocity motion parameters of the remote game peripheral based on the one or more sensor measurements received by the game server and a library of motion parameters.

11. The method of claim 10, further comprising:
upon a determination that a gesture detected based on the one or more sensor measurements fails to meet a threshold gesture value, providing an indication of a reprimand.

12. The method of claim 8, wherein a sensitivity parameter associated with each of the sensors of the remote game peripheral is dynamically modifiable responsive to manipulation of the remote game peripheral.

13. The computer readable storage medium of claim 8, the operations further comprising:
calculating position, distance, and velocity motion parameters of the remote game peripheral based on the one or more sensor measurements and a library of motion parameters.

14. The computer readable storage medium of claim 13, the operations further comprising:
upon a determination that a gesture detected based on the one or more sensor measurements fails to meet a threshold gesture value, providing an indication of a reprimand.

15. The method of claim 8, further comprising deriving a sensor measurement of the one or more sensor measurements based on a tilt angle of the remote game peripheral.

16. The method of claim 8, the first upcoming gesture comprising a game player swinging the remote game peripheral through a broad arc.

17. A computer readable storage medium, the computer readable storage medium not being a transient signal, the computer readable storage medium comprising executable instructions that when executed by a processor cause the processor to effectuate operations comprising:
  execute a game application, the game application configured to respond to gesture input detected based on one or more sensor measurements recorded by sensors of a remote game peripheral and received by a game server, where the game application supports at least a first set and a second set of gestures, the second set of gestures characterized by a greater range of motion than the first set, and where the game application includes a game script that defines an ordered sequence of steps corresponding to gestures expected by the game application during execution of the game application, the ordered sequence of steps specifying gestures from both the first set and the second set of gestures;
  based on a first step in the ordered sequence of steps corresponding to a gesture of the first set of gestures, predict that a first upcoming gesture belongs to the first set of gestures;
  send first sensitivity settings to the remote game peripheral to affect a sensitivity with which a first set of sensor measurements are recorded, the first set of sensor measurements corresponding to the first upcoming gesture;
  after detecting the first upcoming gesture from the first set of sensor measurements received from the remote game peripheral, and based on a second step in the ordered sequence of steps corresponding to a gesture of the second set of gestures, predict that a second upcoming gesture belongs to the second set of gestures; and
  send second sensitivity settings to the remote game peripheral to affect a sensitivity with which a second set of sensor measurements are recorded, the second set of sensor measurements corresponding to the second upcoming gesture.

* * * * *